United States Patent Office 3,119,843
Patented Jan. 28, 1964

3,119,843
3-SULPHAMYL-4-HALOBENZOIC ACID ESTERS OF OXYGEN CONTAINING HETEROCYCLIC ALCOHOLS
Ernst Jucker, Binningen, Basel-Land, and Adolf J. Lindenmann, Basel, Switzerland, assignors to Sandoz Ltd. (also known as Sandoz A.G.), Basel, Switzerland, a Swiss firm
No Drawing. Filed May 8, 1961, Ser. No. 108,308
Claims priority, application Switzerland May 18, 1960
4 Claims. (Cl. 260—345.8)

The present invention relates to new sulphonamides having the structural Formula I,

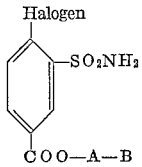

wherein A represents methylene and ethylene and B is selected from the group consisting of nitrogen, oxygen and can also represent a sulphur-containing heterocyclic group linked with one of its carbon atoms to the radical A, their acid addition salts and pharmaceutical compositions containing, in addition to an inert carrier, a Compound I and/or an acid addition salt thereof.

The sulphonamides of this invention and their acid addition salts can be prepared by reacting a compound of the general Formula II,

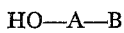

HO—A—B    II wherein A and B have the above significance, with a 3-sulphamyl-4-halogenobenzoyl chloride, and when an acid addition salt is required, salifying with an organic or inorganic acid.

Suitable meanings for the radical B are, for example, a 2- or 3-furyl or tetrahydrofuryl group, a 2-, 3- or 4-pyridyl or -piperidyl group, a 2-, 3- or 4-tetrahydropyranyl group, a 2-, 3- or 4-quinolyl group or a 2- or 3-thienyl group.

The preparation of the new sulphonamides can be carried out as follows: a suspension of 3-sulphamyl-4-chlorobenzoyl chloride is mixed with a Compound II until complete dissolution has taken place. The excess of the Compound II is removed by evaporation in a vacuum. The resulting oily residue is then rubbed to crystallise out the required ester which is then purified.

The compounds of the invention, which are at room temperature solid crystalline compounds, have interesting pharmacodynamic properties and/or may be used as intermediate compounds for the production of pharmaceuticals. The exemplified compounds show, depending upon the nature of the radical A and B in Formula I, diuretic, sodium uretic and chloride uretic properties. In tests with dogs, they have been found to be effective on peroral administration; for example 3-sulphamyl-4-chlorobenzoic acid-tetrahydrofurfuryl ester has been found to be a particularly quick acting salidiureticum when administered to dogs perorally. 0.5 mg./kg. given to dogs perorally has more than doubled excretion of electrolyte after 2 hours.

The compounds can be administered in therapeutic dosages in conventional vehicles as in the form of a tablet as these compounds are effective upon oral administration as well as upon injection.

Examples of suitable acids for salifying the Compounds I are as follows: hydrochloric, hydrobromic, sulphuric, citric, oxalic, tartaric, succinic, maleic, acetic, benzoic, hexahydrobenzoic, methanesulphonic, fumaric, gallic and hydriodic acid.

The preparation of these compounds is more fully described in the following examples. It is to be understood, however, that the examples are illustrative of the compounds embraced by this invention and are not to be construed as limiting the invention to the particular compounds specifically described. All temperatures are stated in degrees centigrade.

*Example 1.—3-Sulphamyl-4-Chloro-Benzoic Acid Tetrahydrofurfuryl Ester*

A suspension of 3.8 g. of 3-sulphamyl-4-chloro-benzoyl chloride in 15 cc. of tetrahydrofurfuryl alcohol is stirred for 24 hours at a temperature of 20–25°, the chloride dissolving completely after a while. The excess tetrahydrofurfuryl alcohol is distilled off in a high vacuum at 80°. The oily residue crystallises when triturated. After having been filtered off the 3-sulphamyl-4-chloro-benzoic acid tetrahydrofurfuryl ester is recrystallised from acetic acid ethyl ester/petroleum ether. M.P., 130–131°.

*Example 2.—3-Sulphamyl-4-Chloro-Benzoic Acid Tetrahydropyranyl-(2')-Methyl Ester*

A suspension of 3.8 g. of 3-sulphamyl-4-chloro-benzoyl chloride in 10 cc. of tetrahydropyranyl-2-methanol is refluxed for two hours at 80° whilst being stirred, the chloride being thus brought to dissolve completely. Stirring of the reaction solution is continued at room temperature for another 12 hours, the major proportion of the excess tetrahydropyranyl-2-methanol being then driven off in a vacuum. A little benzene/petroleum ether is rubbed into the oily residue, causing the 3-sulphamyl-4-chloro-benzoic acid tetrahydropyranyl-(2')-methyl ester to crystallise. After recrystallisation from acetic acid ethyl ester/petroleum ether the ester melts at 161–163°.

*Example 3.—3-Sulphamyl-4-Chloro-Benzoic Acid Pyridyl-(2')-Methyl Ester*

A suspension of 7.5 g. of 3-sulphamyl-4-chloro-benzoyl chloride, 3.5 g. of pyridyl-2-carbinol and 3.5 g. of triethylamine in 20 cc. of benzene is refluxed at 80° for 2 hours whilst being stirred, and for a short while complete solution occurs. Stirring of the reaction mixture is continued at room temperature for another 16 hours. The precipitate formed is filtered off. For removing the triethylamine hydrochloride the filtration residue is triturated in water and chloroform and the undissolved portion, i.e., the 3-sulphamyl-4-chloro-benzoic acid pyridyl-(2')-methyl ester, is dried. After recrystallisation from methanol/petroleum ether the sulphonamide derivative melts at 170–171°.

*Example 4.—3-Sulphamyl-4-Chloro-Benzoic Acid Pyridyl-(3')-Methyl Ester*

A suspension of 7.5 g. of 3-sulphamyl-4-chloro-benzoyl chloride, 3.5 g. of pyridyl-3-carbinol and 3.5 g. of triethylamine in 20 cc. of benzene is refluxed for two hours at 80°, and after a short while complete solution occurs. Stirring of the reaction mixture is continued at room temperature for another 12 hours. The separated precipitate is filtered off, the filtration residue, i.e., the 3 - sulphamyl-4-chloro-benzoic acid pyridyl-(3')-methyl ester, is thoroughly washed with water and benzene and then dried. After recrystallisation from ethanol/petroleum ether the sulphonamide derivative melts at 189–190°.

*Example 5.—3-Sulphamyl-4-Fluoro-Benzoic Acid Tetrahydrofurfuryl Ester*

A solution of 4.6 g. of 3-sulphamyl-4-fluoro-benzoyl chloride in 20 cc. of tetrahydrofurfuryl alcohol is stirred for 24 hours at between 20 and 25°. In a vacuum of about 0.5 mm. Hg and at a temperature of 80° the reaction solution is then evaporated until dry, and the dark oily residue is chromatographed on alumina, the 3-sulphamyl-4-fluoro-tetrahydrofurfuryl ester being eluted with an acetic acid ethyl ester methanol mixture (1:1). The ester is recrystallized from diisopropyl ether. M.P., 91–93°. The 3-sulphamyl-4-fluoro-benzoyl chloride used as a starting material is prepared as follows:

(a) *3-chlorosulphonyl-4-fluoro-benzoic acid.*—A solution of 14.0 g. of 4-fluoro-benzoic acid in 52.0 g. of chlorosulphonic acid is maintained at a temperature of 130° for 10 hours. The solution is then cooled to room temperature and poured on to ice, causing the 3-chlorosulphonyl-4-fluoro-benzoic acid to precipitate. The mixture is filtered, the filtration residue is taken up in ether, separated from a little water, and the ethereal solution dried over magnesium sulphate. The ethereal solution is then concentrated, and petroleum ether is added, causing crystalline precipitation of the 3-chloro-sulphonyl-4-fluoro-benzoic acid. After recrystallisation from benzene/petroleum ether the acid melts at 138–139°.

(b) *3-sulphamyl-4-fluoro-benzoic acid.*—14.1 g. of 3-chlorosulphonyl-4-fluoro-benzoic acid are stirred and strongly cooled whilst 150 cc. of an absolute saturated ethanolic solution of ammonia are added, causing the complete dissolution of the acid. Stirring of the reaction solution is continued at room temperature for another 2 hours. The solution is cencentrated, about 150 cc. of ether are added to the slurry thus formed, and the mixture is filtered. The filtration residue, i.e., the 3-sulphamyl-4-fluorobenzoic acid, is dried in a vacuum and immediately used.

(c) *3-sulphamyl-4-fluoro-benzoyl chloride.*—A mixture of 15.5 g. of 3-sulphamyl-4-fluoro-benzoic acid (raw product) and 31.0 g. of thionyl chloride is kept at a temperature of 100° for an hour. The reaction mixture is then boiled down in a vacuum until dry, the residue is twice washed with 150 cc. of benzene each time, and the undissolved portion is filtered off. The benzene is distilled off in a vacuum and the residue, representing the 3-sulphamyl-4-fluoro-benzoyl chloride, is recrystallised from benzene. M.P. 115–116°.

*Example 6.—3-Sulphamyl-4-Chloro-Benzoic Acid Pryridyl-(4')-Methyl Ester*

A suspension of 6.0 g. of 3-sulphamyl-4-chloro-benzoyl chloride, 2.8 g. of pyridyl-4-carbinol and 2.8 g. of triethylamine in 40 cc. of benzene is refluxed at 80° for 2 hours whilst being stirred, stirring being thereafter continued at room temperature for another 17 hours. The benzene is then decanted and the solid greasy portion triturated in a mixture of acetone and water to remove the triethylamine hydrochloride. The mixture is filtered and, after having been briefly dried in a vacuum, the filtration residue is recrystallised from methanol. The 3-sulphamyl-4-chloro-benzoic acid pyridyl-(4')-methyl ester melts at 184–185°.

*Example 7.—3-Sulphamyl-4-Chloro-Benzoic Acid Quinolyl-(4')-Methyl Ester*

A suspension of 4.0 g. of quinolyl-4-carbinol and 7.5 g. of 3-sulphamyl-4-chloro-benzoyl chloride in 50 cc. of benzene is stirred for 6 days whilst at a temperature of 20 to 25°. The reaction mixture is then filtered, the filtration residue being washed with water and dried in a vacuum for 15 hours. After recrystallisation from methanol the 3-sulphamyl-4-chloro-benzoic-acid-quinolyl-(4')-methyl ester hydrochloride melts at 244–245° (decomp.).

*Example 8.—3-Sulphamyl-4-Chloro-Benzoic Acid Quinolyl-(2')-Methyl Ester*

7.5 g. of 3-sulphamyl-4-chlorobenzoyl chloride are added portionwise to a stirred mixture of 4.8 g. of quinoline-2-carbinol and 3.0 g. of triethylamine in 50 cc. of benzene, stirring being thereafter continued at 20–25° for another 140 hours and 50 cc. of chloroform added in two portions for dissolving the hard mass that is formed. The reaction mixture is then evaporated in a vacuum until dry and the residue divided between 300 cc. of acetic acid ethyl ester and 200 cc of water. After a little undissolved substance has been filtered off and the layers separated, the organic phase is dried over magnesium sulphate, the acetic acid ethyl ester being distilled off in a vacuum and the residue, i.e., the 3-sulphamyl - 4 - chloro - benzoic acid quinolyl-(2')-methyl ester, crystallised from methanol. After having been purified with animal charcoal and twice recrystallised from methanol the sulphonamide derivative melts at 189–191°.

*Example 9.—3-Sulphamyl-4-Chloro-Benzoic Acid [1'-Methyl-Piperidyl-(2')]-Ethyl Ester*

7.5 g. of 3-sulphamyl-4-chlorobenzoyl chloride are added portionwise to a solution of 4.3 g. of 1-methyl-2-β-hydroxyethyl piperidine and 3.5 g. of triethylamine in 20 cc. of benzene whilst being stirred, stirring being thereafter continued at 20–25° for another 96 hours in course of which a semi-solid, partly greasy mass separates off. The mixture is boiled down in a vacuum until dry, 200 cc. of acetic acid ethyl ester and 200 cc. of water are added to the evaporation residue, and the whole is well shaken. After filtering off undissolved substance and separating the layers, the acetic acid ethyl ester solution is united with the filtration residue. The solvent is driven off in a vacuum, the residue being briefly dried in vacuo and then chromatographed on alumina, the 3-sulphamyl-4-chloro-benzoic acid [1-methyl-piperidyl-(2')]-ethyl ester being eluted with a solvent mixture of chloroform and methanol in the proportion of 9:1. The hydrochloride is then prepared from the base in conventional manner with the aid of a 20% ethanolic hydrochloric acid solution. When recrystallised from methanol the 3-sulphamyl-4-chloro-benzoic acid [1'-methyl-piperidyl-(2')]-ethyl ester hydrochloride melts at 178–180° with decomposition.

*Example 10.—3-Sulphamyl-4-Chloro-Benzoic Acid Thienyl-(2')-Methyl Ester*

5.1 g. of 3-sulphamyl-4-chloro-benzoyl chloride are added portionwise to a solution of 2.3 g. of thiophene-2-carbinol and 2.0 g. of triethylamine in 30 cc. of benzene whilst being stirred. An oil begins to separate from the reaction mixture. Stirring of the mixture is continued at 20–25° for another 60 hours, followed by evaporation in a vacuum until dry. The oily evaporation residue is divided between 300 cc. of acetic acid ethyl ester and 300 cc. of water, the two phases being separated and the acetic acid ethyl ester solution dried over magnesium sulphate. After the solvent has been distilled off in a vacuum the oily residue is chromatographed on alumina, the 3-sulphamyl-4-chloro-benzoic acid thienyl-(2')-methyl ester being eluted with a solvent mixture of chloroform and methanol (9:1). After recrystallisation from methanol the sulphonamide derivative melts at 133–134°.

What is claimed is:

1. A member selected from the class consisting of a sulfonamide of the formula

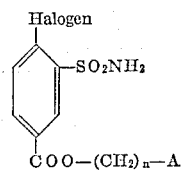

wherein A is a radical of the class consisting of 2-furyl, 3-furyl, 2-tetrahydrofuryl, 3-tetrahydrofuryl, tetrahydropyran-2-yl, tetrahydropyran-3-yl, and tetrahydropyran-4-yl, and $n$ represents one of the whole numbers 1 to 2 inclusive.

2. 3-sulphamyl-4-chlorobenzoic acid tetrahydrofurfur-2-yl ester.

3. 3-sulphamyl-4-fluorobenzoic acid tetrahydrofurfur-2-yl ester.

4. 3-sulphamyl-4-chlorobenzoic acid tetrahydropyranyl-(2')-methyl ester.

References Cited in the file of this patent

UNITED STATES PATENTS

| | | |
|---|---|---|
| 2,715,628 | Stoll et al. | Aug. 6, 1955 |
| 2,719,854 | Kreuchunas | Oct. 4, 1955 |
| 2,757,177 | Krapcho et al. | July 31, 1956 |
| 2,826,584 | Cislak | Mar. 11, 1958 |
| 2,838,516 | Hoffman | June 10, 1958 |
| 2,857,387 | Beaver et al. | Oct. 21, 1958 |
| 2,922,795 | Blicke | Jan. 26, 1960 |
| 2,953,577 | Montagna et al. | Sept. 20, 1960 |